(12) United States Patent
Huttenlocher et al.

(10) Patent No.: US 7,445,383 B2
(45) Date of Patent: Nov. 4, 2008

(54) METHOD AND DEVICE FOR DIAGNOSING AN EXTERNAL TEMPERATURE SENSOR

(75) Inventors: Martin Huttenlocher, Ehningen (DE); Libor Soucek, Neuhausen (DE)

(73) Assignee: Daimler AG, Stuttgart (DE)

( * ) Notice: Subject to any disclaimer, the term of this patent is extended or adjusted under 35 U.S.C. 154(b) by 126 days.

(21) Appl. No.: 11/501,083

(22) Filed: Aug. 9, 2006

(65) Prior Publication Data
US 2007/0036197 A1    Feb. 15, 2007

(30) Foreign Application Priority Data
Aug. 10, 2005   (DE) ........................ 10 2005 037 717

(51) Int. Cl.
*G01K 3/08* (2006.01)
*G01K 15/00* (2006.01)

(52) U.S. Cl. ............................... 374/137; 374/1; 701/34

(58) Field of Classification Search ............. 701/29–31, 701/34; 374/138, 144–45, 137, 1, 30, 134, 374/131; 165/41–44; 376/361–408
See application file for complete search history.

(56) References Cited

U.S. PATENT DOCUMENTS

| | | | | |
|---|---|---|---|---|
| 5,830,106 A | * | 11/1998 | Abe .............................. 477/98 |
| 5,880,361 A | * | 3/1999 | Taniguchi ................. 73/114.34 |
| 5,995,887 A | | 11/1999 | Hathaway et al. |
| 6,091,324 A | * | 7/2000 | Arsenault et al. ............ 340/449 |
| 6,321,533 B1 | | 11/2001 | Watanabe et al. ............. 60/324 |
| 6,463,892 B1 | * | 10/2002 | Russell ..................... 123/41.15 |
| 6,684,154 B2 | | 1/2004 | Isobe et al. |
| 6,712,133 B1 | * | 3/2004 | Kyrtsos et al. ............... 165/239 |
| 6,732,025 B2 | * | 5/2004 | Reese et al. .................... 701/29 |
| 6,752,011 B2 | * | 6/2004 | Matsumoto et al. ....... 73/114.68 |
| 6,931,865 B1 | * | 8/2005 | Van Gilder et al. ............ 62/129 |
| 7,085,671 B2 | * | 8/2006 | Fujimoto et al. ............. 702/132 |
| 7,137,295 B2 | * | 11/2006 | Wakahara et al. .......... 73/119 R |
| 7,309,536 B2 | * | 12/2007 | Gabriel et al. ................. 429/13 |
| 2003/0009276 A1 | * | 1/2003 | Isobe et al. .................. 701/114 |
| 2003/0106304 A1 | * | 6/2003 | Miyahara et al. ............... 60/277 |
| 2005/0087152 A1 | * | 4/2005 | Wakahara et al. ........ 123/41.15 |
| 2006/0021361 A1 | * | 2/2006 | Gerum et al. .................. 62/127 |
| 2006/0093014 A1 | * | 5/2006 | Higashiyama et al. ......... 374/1 |

FOREIGN PATENT DOCUMENTS

DE    38 30 389 C2    4/1989
DE    199 51 788 C2   11/2001

(Continued)

OTHER PUBLICATIONS

German Search Report dated Jan. 20, 2006 including English Translation of relevant portion (Nine (9) pages).

*Primary Examiner*—Michael Cygan
*Assistant Examiner*—Bret Adams
(74) *Attorney, Agent, or Firm*—Crowell & Moring LLP

(57) ABSTRACT

A method and apparatus for fault recovery and/or fault detection of an external temperature sensor of a motor vehicle, in which a temperature gradient is determined from the profile of the measured temperatures over time, in which the determined temperature gradient is compared with a predefined or predefinable limiting gradient, and in which a fault is detected as a function of this comparison.

20 Claims, 2 Drawing Sheets

FOREIGN PATENT DOCUMENTS

| | | |
|---|---|---|
| DE | 101 12 139 A1 | 9/2002 |
| DE | 103 16 606 A1 | 11/2004 |
| DE | 103 29 038 B3 | 2/2005 |
| EP | 1 136 800 A1 | 9/2001 |
| JP | 2004-325110 A | 11/2004 |

* cited by examiner

METHOD AND DEVICE FOR DIAGNOSING AN EXTERNAL TEMPERATURE SENSOR

BACKGROUND AND SUMMARY OF THE INVENTION

Priority to German Patent Application 102005037717.3-52 is claimed, the disclosure of which is incorporated herein by reference.

The present invention relates to a method for diagnosing an external temperature sensor of a motor vehicle and a device for carrying out this method.

U.S. Pat. No. 6,684,154 B2 discloses checking the satisfactory functioning of an engine temperature sensor by storing the last temperature value when the engine is switched off. When the engine is switched on later, a difference between the stored last temperature value and a measured current temperature value is compared with a difference which is formed from the last stored temperature value and a calculated temperature value, the calculated temperature value being calculated as a function of operating conditions of the engine and as a function of the time period between the switching off and the switching on of the engine.

U.S. Pat. No. 5,995,887 discloses checking the functioning of a transmission temperature sensor by determining a transmission oil temperature with the transmission temperature sensor when the vehicle starts and comparing it with a predefined lower limiting value as well as with a predefined upper limiting value. If the measured temperature lies below the lower limiting value or above the upper limiting value, a malfunction is detected if the temperature measured with the transmission temperature sensor does not change by a predetermined value during the further operation of the vehicle.

German Patent Document DE 38 30 389 C2 discloses checking the functional capability of a temperature sensor in a temperature-controlled heating device by virtue of the fact that a control unit has a heating element energy counter and a counter controller for incrementing and decrementing the heating energy counter at speeds which are a function of the power absorbed by the heating element, the counter reading of the heating element energy counter following the temperature of the heating element. A malfunction of the temperature sensor occurs if the counter reading of the heating element energy counter lies within a predetermined reference range and the measured temperature lies outside a correlative predetermined reference temperature range.

German Patent Document DE 103 29 038 B3 tests an engine temperature sensor for a defect on the basis of the change in the sensed temperature. The sensor is defective if the measured temperature does not change by a certain minimum absolute value within a predefined time. It is assumed that a motor sensor which does not react is defective. However, this method is unsuitable for external temperature sensors since the measured external temperature can easily remain the same over several hours.

German Patent Document DE 199 51 788 C2 compares the measured values of two independent temperature sensors with one another in order to decide whether a sensor is defective. However, an increased amount of expenditure on hardware is necessary in this context.

Japanese Patent Document JP 2004325110 A discloses a temperature sensor for batteries, a plurality of which can be connected in series. A fault is detected if the change of temperature exceeds a value. However, there is no differentiation between two different faults or groups of faults on the basis of the sign of the temperature gradient. The method cannot be transferred to an external temperature sensor.

German Patent Document DE 101 12 139 A1 as well as DE 103 16 606 A1 disclose further methods and devices in which, in order to check a temperature sensor, the measured temperature values of at least two different temperature sensors are compared with one another.

External temperature sensors in motor vehicles must operate reliably over relatively large temperature ranges. For example, temperature sensors have to supply reliable temperature values between −40° and +85° C. A malfunction of the external temperature sensor can be detected, for example, if the measured external temperature lies outside the aforesaid external temperature measuring range. For example, temperatures of higher than +85° C. and lower than −40° C. can be triggers for the setting of a fault signal. In modern motor vehicles, such a fault signal is stored centrally and appears automatically when the vehicle is next serviced. As a result, the external temperature sensor is replaced, which is associated with corresponding expenditure. However, it has become apparent that temperatures below −40° C. can actually occur at least in some geographic zones so that temperatures outside the temperature measuring range cannot necessarily be attributed to a malfunction of the external temperature sensor. For this reason, a possible way of being able to detect malfunctions of the external temperature sensor more reliably is sought.

The present invention is concerned with the problem of specifying an improved method and device for diagnosing an external temperature sensor of a motor vehicle, which can detect, in particular, the presence of a malfunction with increased reliability and can preferably differentiate the occurrence of extreme temperatures from a fault.

The invention is based on the concept of comparing a temperature gradient determined with the external temperature sensor with a limiting gradient in order to assess the reliability of the measured temperatures. If the measured temperature rises more quickly or drops more quickly than the limiting gradient, a malfunction has occurred. The invention makes use here of the realization that the external temperature sensors which are generally used can only follow extreme temperature differences at a limited maximum speed owing to their physical properties. The aforesaid limiting gradient is aimed at this maximum realizable temperature change per time unit. If the measured temperature change per time unit is greater in absolute value than the maximum temperature change per time unit which can be realized physically by the external temperature sensor, a malfunction of the external temperature sensor or of the entire arrangement for measuring the external temperature has inevitably occurred.

In the case of an external temperature sensor which operates with a Negative Temperature Coefficient (NTC) element, the temperature is determined as a function of the electrical resistance of the NTC element. As the temperature drops, the resistance of the NTC element rises. A cable break within the measuring arrangement gives rise to an extremely steep rise in the resistance and accordingly to an extremely steeply dropping temperature gradient which is at any rate greater in absolute value than the limiting gradient. The NTC element is a thermistor which is composed of a semiconductor resistor which senses temperatures.

According to one embodiment, a first fault is detected if the determined temperature gradient is positive and greater in absolute value than the limiting gradient, while a second fault is detected if the determined temperature gradient is negative and greater in absolute value than the limiting gradient, is of particular advantage. In this embodiment, faults which arise when there are positive temperature gradients can thus be differentiated from faults which arise when there are negative temperature gradients. As a result, it is possible to refine the diagnosis, which simplifies the possibility of recovering from faults.

Of course, the features mentioned above and to be explained below can be used not only in the respectively specified combination but also in other combinations or alone without departing from the scope of the present invention.

Preferred exemplary embodiments of the invention are illustrated in the drawings and will be explained in more detail in the following description in which identical reference symbols relate to identical or similar or functionally identical components.

DETAILED DESCRIPTION OF THE DRAWINGS

Figure 1:
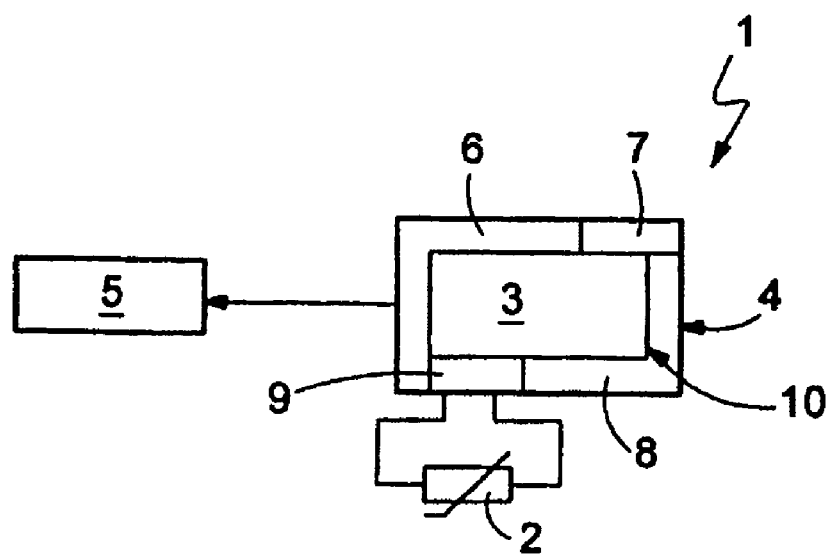
FIG. 1 shows a simplified, circuit diagram-like illustration of a device for diagnosing an external temperature sensor.

According to FIG. 1, an external temperature measuring arrangement 1 comprises an external temperature sensor 2 and a controller 3. The external temperature measuring arrangement 1 is accommodated in a motor vehicle (not shown). The external temperature sensor 2 is preferably located in a front mud flap of the vehicle. The controller 3 is arranged in a control unit 4 and can be integrated into a network (not shown) which is composed of a multiplicity of individual interconnected control units. The control unit 4 is preferably a central control unit which makes available the determined external temperature for tapping by other control units and/or which feeds the measured external temperature actively to other control units, preferably to a display device 5. The control unit 4 comprises, for example, a CAN bus 6 as well as a Lin bus 7. Furthermore, the control unit 4 can have diverse drivers 8 and be equipped with inputs 9 to which the external temperature sensor 2 is connected.

The external temperature sensor 2 preferably operates with a PTC (Positive Temperature Coefficient) or NTC element. Here, PTC or NTC stands for "Positive Temperature Coefficient" and means that the PTC or NTC element changes its electrical resistance as a function of its temperature. For example, the electrical resistance of the PTC or NTC element increases strongly as the temperature drops, while it decreases correspondingly as the temperature rises. The relationship between the ambient temperature and electrical resistance of the PTC or NTC element may be stored, for example, in the form of a characteristic curve in the controller 3. The controller 3 thus measures the electrical resistance of the PTC or NTC element and assigns the associated temperature value to the measured resistance by means of the characteristic curve. For example, the external temperature sensor 2 is configured for a temperature range from −40° C. to +85° C. If the electrical resistance of the PTC or NTC element rises above the value assigned to the lower temperature limiting value, the controller 3 can still only detect that the temperature is lower than the lower temperature limiting value, that is to say for example lower than −40° C. In contrast to this, in the case of a resistance which is lower than the value assigned to the upper temperature limiting value, the controller 3 detects that the measured temperature lies above the upper temperature limiting value, that is say is for example higher than +85° C.

The ambient temperature of the vehicle which is determined using the external temperature measuring arrangement 1 has to be relatively reliable. In order to ensure the quality of the temperature measurement, in the diagnostic method according to the invention a temperature gradient is determined from the time profile of the measured temperatures, that is to say the change in temperature per time unit is determined. The determined temperature gradient is then compared with a predefined or predefinable limiting gradient. A fault or a malfunction of the external temperature sensor 2 or of the external temperature measuring arrangement 1 can then be detected as a function of this comparison. A diagnostic device 10 for carrying out this diagnostic method comprises here essentially the controller 3 which is designed to carry out the method and is programmed in particular in a suitable way.

External temperature sensors 2, in particular if they operate with a PTC or NTC element, have a limiting value for the maximum possible positive or negative temperature change per time unit for physical reasons. The limiting gradient is aimed at this limiting value, that is say the limiting gradient is formed by this limiting value or is selected to be greater than this limiting value. If the controller 3 determines a temperature gradient which is greater in absolute value than the aforesaid limiting gradient, the external temperature sensor 2 cannot sense an actual temperature change under any circumstances. Consequently, a fault may be present in the temperature measuring arrangement 1.

In a preferred embodiment, the controller 3 can also detect whether the determined temperature gradient is positive or negative. If a positive temperature gradient is present which is greater in absolute value than the limiting gradient, a first fault can be detected. For example, an excessively large positive temperature gradient is an indication of a defective external temperature sensor 2 or of a short circuit of the external temperature sensor 2 to the negative terminal of the vehicle battery.

When there is a line break, the electrical resistance rises toward infinity, which, however, leads, according to the characteristic curve, to a strongly dropping temperature, that is to say to a negative temperature gradient. It can therefore a positive gradient temperature is on the other hand an indication of a line break to ground.

If the temperature gradient is negative and greater in absolute value than the limiting gradient, the controller 3 can detect a second fault. For example, there may then be a short circuit of the external temperature sensor 2 to the negative terminal of the vehicle battery, that is to say to ground. By determining the sign of the temperature gradient it is thus possible to differentiate at least between two different faults or groups of faults.

Furthermore it is expedient if, after the occurrence of a temperature gradient which is greater in absolute value than the limiting gradient, the controller 3 additionally checks the temperature which is subsequently measured with the external temperature sensor 2. To do this, the controller 3 compares the subsequently measured temperature with a temperature measuring range of the external temperature sensor 2. This temperature measuring range lies, for example, between −40° C. and +85° C. A fault will be present only if the subsequently measured temperature lies outside the aforesaid temperature measuring range. In order to be able to exclude random interference within the temperature measuring arrangements 1 as faults, it is expedient if the controller 3 according to a preferred embodiment detects a fault only if the subsequently measured temperature lies outside the aforesaid temperature range for a predefined or predefinable qualification time. For example, the qualification time is approximately two seconds. The coupling of information from inadmissible temperature gradients and inadmissible temperatures as proposed here allows random fluctuations, faults and the like to be avoided as triggers for fault messages. The diagnosis thus operates more reliably.

The checking of the subsequently measured temperature can also be used to differentiate different fault sources. For example, a first fault or a first group of faults is identified if the subsequently measured temperature lies above the temperature measuring range. In contrast to this, a second fault or a second group of faults is present if the subsequently measured temperature lies below the temperature measuring range. The differentiation described here between the first and second faults can be applied optionally or in addition to the differentiation between different faults or groups of faults which is explained further in more detail above with respect to the sign of the temperature gradient.

Figure 2:
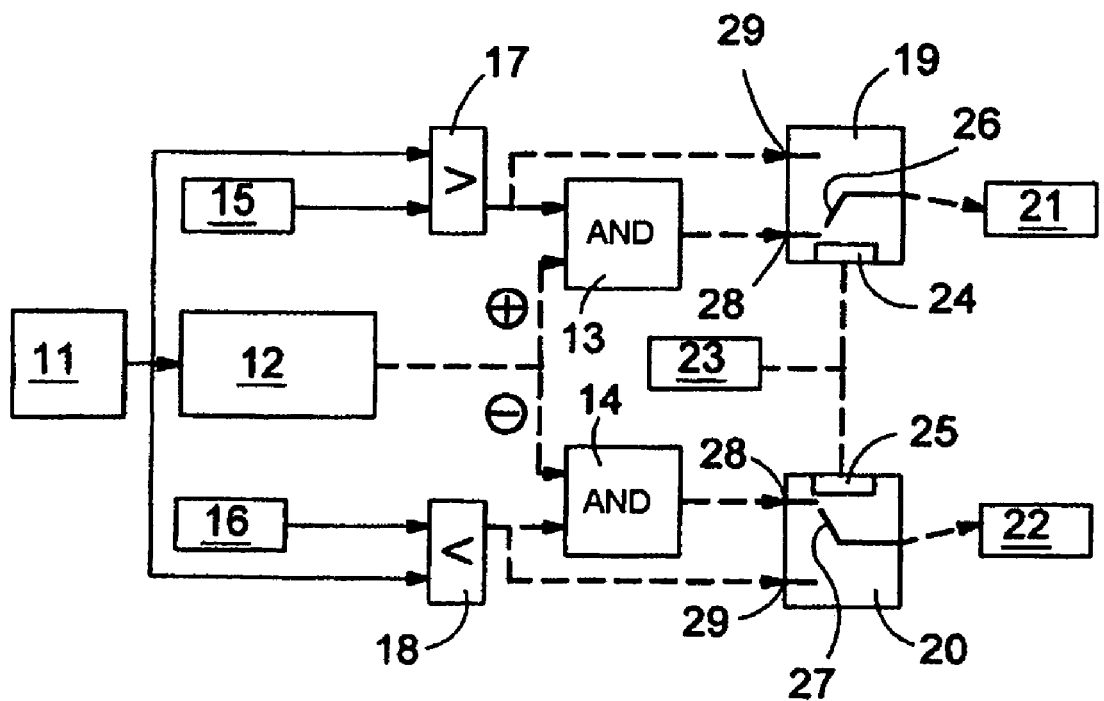
FIG. 2 is a circuit diagram-like diagram illustrating a method for diagnosing an external temperature sensor.

In the text which follows, the basic functional principle of the method according to the invention will be explained in more detail with reference to FIG. 2.

While the vehicle is operating, the external temperature sensor 2 supplies temperature values and resistance values which are correlated thereto and which are sensed by the controller 3 as temperatures. The temperature values which are made available are symbolized in FIG. 2 by a block 11. A block 12 symbolizes the monitoring of gradients, that is to say the determination of the temperature gradient and the comparison with the limiting gradient. If a temperature gradient is present which is inadmissibly large in absolute value, a corresponding signal is transmitted to an AND element 13, 14. If the gradient is a positive temperature gradient, a corresponding signal is set at the upper AND element 13. If the temperature gradient is negative, a corresponding signal is set at the lower AND element 14. At the same time checking is carried out to determine whether the temperature made available in block 11 lies within the temperature measuring range. To do this, an upper limiting temperature, symbolized by a block 15, and a lower limiting temperature, symbolized by a block 16, are monitored separately. The upper limiting temperature 15 is, for example, +85° C. The lower limiting temperature 16 is, for example, −40° C.

In comparison blocks 17 and 18 checking is carried out to determine whether the measured temperature lies above the upper limiting temperature 15 or below the lower limiting temperature 16. If, for example, the measured temperature lies above the upper limiting temperature 15, a corresponding signal is set and fed to the upper AND element 13. However, if the measured temperature lies below the lower limiting temperature 16, a corresponding signal is fed to the lower AND element 14.

If both conditions are met at one of the two AND elements 13, 14, a corresponding signal is set and fed to a corresponding fault signalling element 19 or 20. A corresponding fault display can then be generated by means of display elements 21 and 22.

During a starting process of the vehicle or when a network into which the temperature measuring arrangement 1 is integrated is powering up or "waking up", no reliable temperature change values, and thus no reliable temperature gradients, are available so that a representative gradient monitoring process is not yet possible. For this purpose, during an initialization phase by means of an initialization element 23 a corresponding initialization signal is generated and fed to switching elements 24 and 25 of the fault signalling elements 19, 20. These may switch over internal connecting elements 26 and 27 for the duration of the initialization phase. In the normal operating state shown, these connecting elements 26, 27 are each connected via a first input 28 of the respective fault signalling element 19, 20 to the associated AND elements 13, 14. During the initialization phase, the connecting elements 28 are each connected to a second terminal 29 of the respective fault signalling element 19, 20 and directly connected via the latter to the comparison elements 17, 18. In this way it is possible to detect a fault in the case of initialization even if the measured temperature lies outside the temperature measuring range although it is not possible to detect an inadmissible temperature gradient.

Figure 3:
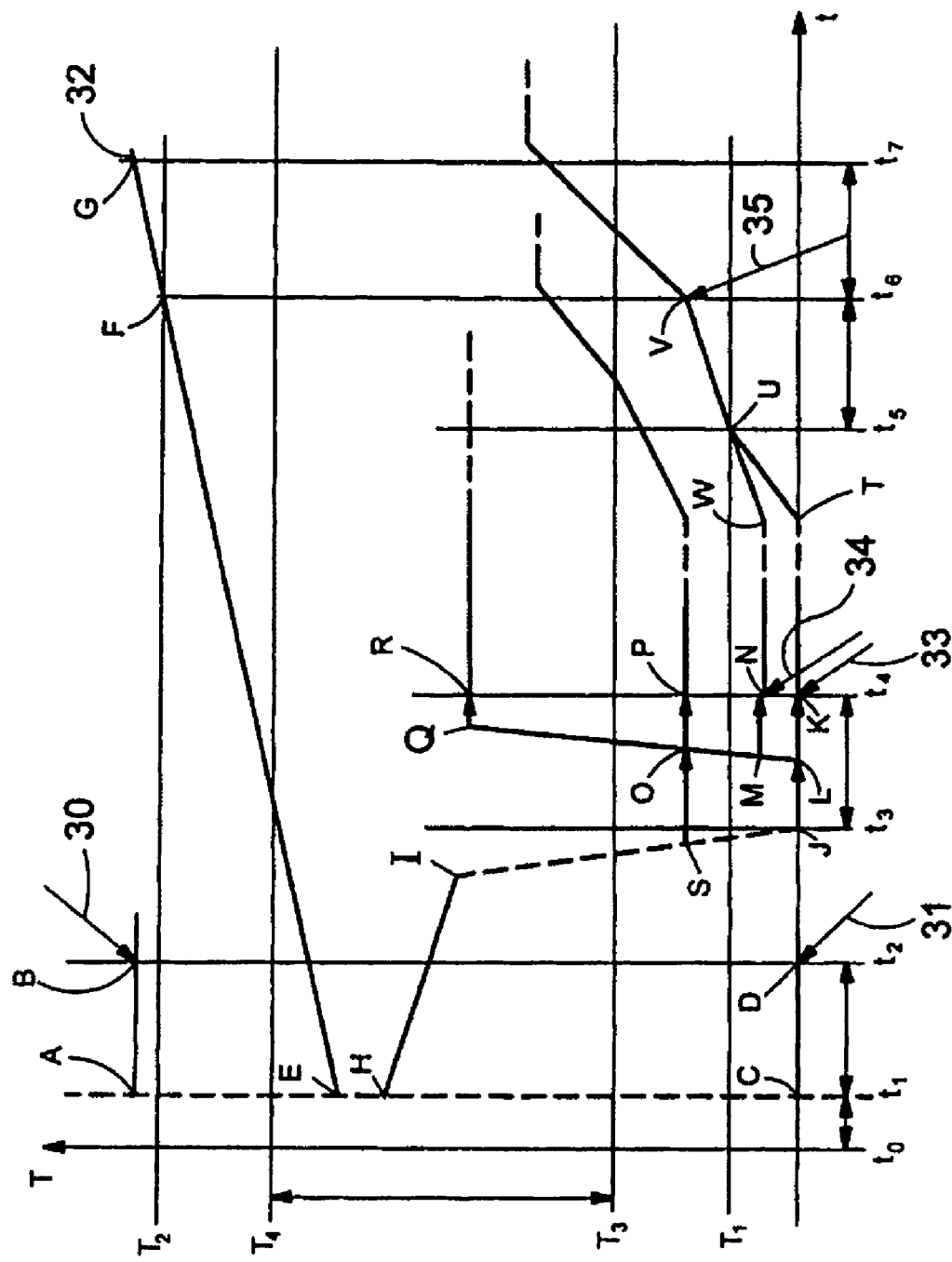
FIG. 3 is a time/temperature graphic visualizing the diagnostic method.

In the diagram corresponding to FIG. 3, the time t is plotted on the abscissa and the temperature T on the ordinate. A temperature $T_1$ symbolizes the lower limiting temperature, for example −40° C., of the temperature measuring range. A temperature $T_2$ symbolizes an upper limiting temperature, for example +85° C. of the temperature measuring range. Basically, the diagnosis can be carried out in the entire temperature measuring range. However, in a variant of the method the diagnosis is carried out in a diagnostic temperature range which lies inside the temperature measuring range. The temperature $T_3$ symbolizes a lower limiting temperature of the diagnostic temperature range which lies above the lower limiting temperature $T_1$. The temperature $T_4$ symbolizes the upper limiting temperature of the diagnostic temperature range which lies below the upper limiting temperature $T_2$ of the temperature measuring range. For example, the diagnostic temperature range extends from −30° C. to +70° C.

The measurement of time starts at a time $t_0$. This is the time when the network wakes up or is powered up and the time when the motor vehicle starts. At the time t0 the initialization phase begins. This ends at the time $t_1$. In this embodiment, no measurements occur during the initialization phase. If an inadmissible temperature is detected at the end of the initialization phase, that is to say at $t_I$, this is immediately followed by checking to determine whether the faulty temperature is at least present during the qualification time. If this is the case, a corresponding fault signal is set. For example, an inadmissibly high temperature is present between the points A and B. At the time $t_2$, a corresponding fault is then qualified, which is indicated in FIG. 3 by an arrow 30. Alternatively, it is possible to determine, between the points C and D, a temperature which lies below the lower limiting temperature $T_1$ and is present at least during the qualification time. Starting from the time $t_2$ it is possible to qualify a corresponding fault again, cf. arrow 31.

A different example is shown by the straight line of the profile through the points E, F and G which has an admissible positive gradient and thus represents an admissible temperature gradient. No inadmissible temperature gradient is thus determined within the diagnostic temperature range. A new qualification time which ends at the point G at the time $t_7$ therefore only starts when the temperature measuring range is exceeded, that is to say at point F at the time $t_6$. If, as here, inadmissible high temperatures are present during this time period, a further fault message is generated corresponding to an arrow 32.

In another example, an admissible temperature gradient with a negative sign is present between the points H and I. The temperature profile drops strongly between the points I and J, specifically with a temperature gradient which is greater in absolute value than the limiting gradient. Since the point J lies below the lower limiting temperature $T_1$, the qualification time starts at the time $t_3$. If the profile extends from the point J to the point K, it is possible at the point $t_4$ that is to say after the qualification time corresponding to an arrow 33 has expired, to detect the presence of a fault. If the temperature profile follows the points L, M and N starting from the point J, a fault message occurs corresponding to an arrow 34 since the temperature within the qualification time lies outside the temperature measuring range. However, if the temperature profile follows the points L, O and P or L, Q and R starting from the point J, a fault message does not occur since the temperature does not lie outside the temperature measuring range during the entire qualification time. The same also applies to the case in which the profile does not pass into the region of inadmissible temperatures at all after the point I but rather, for example, passes from a point S to the point P or from S to the point R via O and Q still within the temperature measuring range. In these cases, the qualification time does not begin to run at all.

According to one advantageous embodiment, in the diagnostic method according to the invention a fault which has been detected can also be reset again and is considered to be eliminated if a temperature gradient is determined which is smaller in absolute value than the limiting gradient during a predefined or predefinable correction time. Optionally, or as here in addition, in order to eliminate a fault the condition that a temperature is measured which lies within the temperature measuring range during the predefined or predefinable correction time must be met. For example, a fault has been detected at the point K corresponding to the arrow 33. If the temperature profile follows the points T, Q and V after the point K, it reaches admissible temperatures again with an admissible gradient at the point U. Accordingly, the correction time begins to run at the time $t_5$. If the desired conditions apply during the entire correction time, the fault can be eliminated at the end of said correction time at the time $t_6$, that is to say at point V. This is indicated in FIG. 3 by an arrow 35. The same also applies to the example in which a fault has been set corresponding to arrow 34 at the point N. If the later profile follows the points W, U and V starting from the point N, the fault message is eliminated again.

The correction time can be of equal length to or longer than or shorter than the qualification time.

The invention claimed is:

1. A method for at least one of fault recovery and fault detection in an external temperature sensor of a motor vehicle, comprising the steps:
   determining a temperature gradient from a profile of measured temperatures over time,
   comparing the determined temperature gradient with a predefined or predefinable limiting gradient,
   detecting a fault as a function of the step of comparing, wherein a first fault is detected when the determined temperature gradient is positive and greater in absolute value than the limiting gradient, wherein a second fault is detected when the determined temperature gradient is negative and greater in absolute value than the limiting gradient and wherein two different faults or groups of faults are differentiated as a function of a sign of the temperature gradient.

2. The method as claimed in claim 1, wherein a line break is diagnosed when there is a negative temperature gradient and a line short-circuit is diagnosed when there is a positive temperature gradient, or a line break is diagnosed when there is a positive temperature gradient and a line short-circuit is diagnosed when there is a negative temperature gradient.

3. The method as claimed in claim 1, wherein a fault is detected when the determined temperature gradient is greater in absolute value than the limiting gradient.

4. A method for at least one of fault recovery and fault detection in an external temperature sensor of a motor vehicle, comprising the steps:
   determining a temperature gradient from a profile of measured temperatures over time,
   comparing the determined temperature gradient with a predefined or predefinable limiting gradient,
   detecting a fault as a function of the step of comparing, wherein a first fault is detected if the determined temperature gradient is positive and greater in absolute value than the limiting gradient, wherein a second fault is detected if the determined temperature gradient is negative and greater in absolute value than the limiting gradient and wherein two different faults or groups of faults are differentiated as a function of a sign of the temperature gradient, wherein, after the occurrence of the temperature gradient which is greater in absolute value than the limiting gradient, additional checking is carried out to determine whether the subsequently measured temperature lies within a temperature measuring range of the external temperature sensor, or a fault is not detected until the subsequently measured temperature lies outside the temperature measuring range.

5. The method as claimed in claim 4, wherein a fault is not detected until the subsequently measured temperature lies outside the temperature measuring range during a predefined or predefinable qualification time.

6. The method as claimed in claim 4, wherein a first fault is detected when the subsequently measured temperature lies above the temperature measuring range, and a second fault is detected when the subsequently measured temperature lies below the temperature measuring range.

7. The method as claimed in claim 1, wherein the temperature gradient is determined only within a diagnostic temperature range which lies within a temperature measuring range of the external temperature sensor.

8. The method as claimed in claim 1, wherein a detected fault is considered to be eliminated when a temperature gradient is determined which is smaller in absolute value than the limiting gradient during a predefined or predefinable correction time, or when a temperature is measured which lies within the temperature measuring range during a predefined or predefinable correction time.

9. The method as claimed in claim 1, wherein the external temperature sensor is equipped with a PTC or NTC element and the temperature is determined by means of the electrical resistance of the PTC or NTC element which is dependent on the temperature.

10. A device for diagnosing an external temperature sensor of a motor vehicle said device comprising:
    a controller which determines a temperature gradient from a time profile of the measured temperatures, compares the determined temperature gradient with a predefined or predefinable limiting gradient,
    a temperature measuring arrangement which detects a first fault when the determined temperature gradient is positive and is greater in absolute value than the limiting gradient, and which detects a second fault when the determined temperature gradient is negative and is greater in absolute value than the limiting gradient, and
    a diagnostic device which differentiates between two different faults or groups of faults as a function of the sign of the temperature gradient.

11. The method as claimed in claim 2, wherein a fault is detected when the determined temperature gradient is greater in absolute value than the limiting gradient.

12. The method as claimed in claim 2, wherein, after the occurrence of the temperature gradient which is greater in absolute value than the limiting gradient, additional checking is carried out to determine whether the subsequently measured temperature lies within a temperature measuring range of the external temperature sensor, or a fault is not detected until the subsequently measured temperature lies outside the temperature measuring range.

13. The method as claimed in claim 3, wherein, after the occurrence of the temperature gradient which is greater in absolute value than the limiting gradient, additional checking is carried out to determine whether the subsequently measured temperature lies within a temperature measuring range of the external temperature sensor, or a fault is not detected until the subsequently measured temperature lies outside the temperature measuring range.

14. The method as claimed in claim 2, wherein the temperature gradient is determined only within a diagnostic temperature range which lies within a temperature measuring range of the external temperature sensor.

15. The method as claimed in claim 3, wherein the temperature gradient is determined only within a diagnostic temperature range which lies within a temperature measuring range of the external temperature sensor.

16. The method as claimed in claim 4, wherein the temperature gradient is determined only within a diagnostic temperature range which lies within a temperature measuring range of the external temperature sensor.

17. The method as claimed in claim 5, wherein the temperature gradient is determined only within a diagnostic temperature range which lies within a temperature measuring range of the external temperature sensor.

18. The method as claimed in claim 2, wherein a detected fault is considered to be eliminated when a temperature gradient is determined which is smaller in absolute value than the limiting gradient during a predefined or predefinable correction time, or when a temperature is measured which lies within the temperature measuring range during a predefined or predefinable correction time.

19. The method as claimed in claim 3, wherein a detected fault is considered to be eliminated when a temperature gradient is determined which is smaller in absolute value than the limiting gradient during a predefined or predefinable correction time, or when a temperature is measured which lies within the temperature measuring range during a predefined or predefinable correction time.

20. The method as claimed in claim 2, wherein the external temperature sensor is equipped with a PTC or NTC element and the temperature is determined by means of the electrical resistance of the PTC or NTC element which is dependent on the temperature.

* * * * *